US011225705B2

(12) United States Patent
Matsumoto et al.

(10) Patent No.: US 11,225,705 B2
(45) Date of Patent: Jan. 18, 2022

(54) HIGH-MN AUSTENITIC STAINLESS STEEL FOR HYDROGEN HAVING EXCELLENT WELDABILITY, WELDED JOINT USING SAME, DEVICE FOR HYDROGEN USING SAME, AND METHOD FOR PRODUCING WELDED JOINT

(71) Applicant: NIPPON STEEL Stainless Steel Corporation, Tokyo (JP)

(72) Inventors: Kazuhisa Matsumoto, Tokyo (JP); Masaharu Hatano, Tokyo (JP); Jun Nakamura, Tokyo (JP)

(73) Assignee: NIPPON STEEL STAINLESS STEEL CORPORATION, Tokyo (JP)

(*) Notice: Subject to any disclaimer, the term of this patent is extended or adjusted under 35 U.S.C. 154(b) by 138 days.

(21) Appl. No.: 16/493,265

(22) PCT Filed: Mar. 20, 2018

(86) PCT No.: PCT/JP2018/011084
§ 371 (c)(1),
(2) Date: Sep. 11, 2019

(87) PCT Pub. No.: WO2018/180788
PCT Pub. Date: Oct. 4, 2018

(65) Prior Publication Data
US 2020/0131610 A1 Apr. 30, 2020

(51) Int. Cl.
C22C 38/60 (2006.01)
C22C 38/00 (2006.01)
C22C 38/02 (2006.01)
C22C 38/04 (2006.01)
C21D 6/00 (2006.01)
C21D 9/50 (2006.01)
C22C 38/06 (2006.01)
C22C 38/42 (2006.01)
C22C 38/44 (2006.01)
C22C 38/46 (2006.01)
C22C 38/48 (2006.01)
C22C 38/50 (2006.01)
C22C 38/52 (2006.01)

(52) U.S. Cl.
CPC .............. *C22C 38/60* (2013.01); *C21D 6/004* (2013.01); *C21D 9/50* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01)

(58) Field of Classification Search
CPC .......... C22C 38/60; C22C 38/02; C22C 38/04
USPC ....................................................... 148/320
See application file for complete search history.

(56) References Cited

U.S. PATENT DOCUMENTS

| | | | |
|---|---|---|---|
| 2005/0178477 A1* | 8/2005 | Igarashi | .................. C22C 38/46 148/325 |
| 2013/0174949 A1 | 7/2013 | Hatano et al. | |
| 2014/0017111 A1 | 1/2014 | Omura et al. | |
| 2014/0186101 A1 | 7/2014 | Hirata et al. | |
| 2015/0167134 A1 | 6/2015 | Leistner et al. | |
| 2016/0304983 A1 | 10/2016 | Omura et al. | |
| 2018/0030566 A1 | 2/2018 | Matsumoto et al. | |

FOREIGN PATENT DOCUMENTS

| | | | |
|---|---|---|---|
| EP | 1 605 073 A1 | | 12/2005 |
| EP | 1645355 A1 | | 4/2006 |
| JP | 4178670 B2 | * | 11/2008 |
| JP | 2009-133001 A | | 6/2009 |
| JP | 2014-47409 A | | 3/2014 |
| JP | 2015-171729 A | | 10/2015 |
| JP | 2015-196837 A | | 11/2015 |
| JP | 2016-414 A | | 1/2016 |
| JP | 2016-74976 A | | 5/2016 |
| JP | 2016-199776 A | | 12/2016 |
| JP | 2016-199782 A | | 12/2016 |
| JP | 2017-8413 A | | 1/2017 |
| JP | 6606947 B2 | | 11/2019 |
| WO | WO 2004/083477 A1 | | 9/2004 |
| WO | WO 2012/043877 A1 | | 4/2012 |
| WO | WO 2012/132992 A1 | | 10/2012 |
| WO | WO 2013/005570 A1 | | 1/2013 |
| WO | WO 2016/068009 A1 | | 5/2016 |
| WO | WO 2016/143486 A1 | | 9/2016 |

OTHER PUBLICATIONS

Kitazawa et al., JP 4178670 B2 machine translation, Nov. 12, 2008, entire translation (Year: 2008).*
Codecogs, "Impurities in Steel", Feb. 11, 2009, URL: <https://www.codecogs.com/library/engineering/metallurgy/impurities-in-steel.php>, entire document (Year: 2009).*

(Continued)

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

This austenitic stainless steel contains, by mass %: C: 0.3% or less, Si: 0.1% to 1.5%, Mn: 5.5% to 20%, P: 0.050% or less, S: 0.005% or less, Cr: 10% to 20%, Ni: 4.0% to 12%, N: 0.40% or less, Cu: 4.0% or less, O: 0.02% or less, and either one or both of Ca: 0.01% or less and Al: 0.3% or less, with a remainder being Fe and inevitable impurities, and the following Formula (1) is satisfied.

$$[Ni]+[Cu]+12.93[C]+1.11[Mn]+0.72[Cr]+0.88[Mo]-0.27[Si]+7.55[N] \geq 29.3 \quad \text{Formula (1)}$$

20 Claims, No Drawings

(56) References Cited

OTHER PUBLICATIONS

International Search Report for PCT/JP2018/011084 (PCT/ISA/210) dated Jun. 12, 2018.
Written Opinion of the International Searching Authority for PCT/JP2018/011084 (PCT/ISA/237) dated Jun. 12, 2018.
Extended European Search Report for counterpart Application No. 18776105.1, dated Feb. 18, 2020.

* cited by examiner

HIGH-MN AUSTENITIC STAINLESS STEEL FOR HYDROGEN HAVING EXCELLENT WELDABILITY, WELDED JOINT USING SAME, DEVICE FOR HYDROGEN USING SAME, AND METHOD FOR PRODUCING WELDED JOINT

TECHNICAL FIELD

The present invention relates to an austenitic stainless steel which is used in a high-pressure hydrogen gas and liquid hydrogen environment and has excellent weldability and hydrogen embrittlement resistance characteristics (resistance to hydrogen embrittlement), a welded joint using the austenitic stainless steel, a device for hydrogen using the austenitic stainless steel, and a method for producing a welded joint.

The present application claims priority on Japanese Patent Application No. 2017-069239 filed on Mar. 30, 2017, the content of which is incorporated herein by reference.

BACKGROUND ART

In recent years, technologies using hydrogen as energy have been developed to suppress greenhouse gas ($CO_2$, $NO_x$, $SO_x$) emission from the viewpoint of global warming prevention. From such a background, development of metal materials to be used for storing and transporting hydrogen has been expected.

In Japan, marketing of fuel cell vehicles has been started with the construction of hydrogen stations.

Nowadays, hydrogen is generally stored as a high-pressure gas. However, hydrogen stations have also been demonstrated in which a large amount of hydrogen is stored as liquid hydrogen, and the pressure of the liquid hydrogen can be boosted as necessary to supply the hydrogen as a high-pressure hydrogen gas of 70 MPa or greater.

For the growth and autonomous development of the future hydrogen energy society with a focus on fuel cell vehicles, it is necessary to reduce cost for fuel cell vehicles or hydrogen stations. That is, metal materials to be used in a hydrogen embrittlement environment are required to have a higher strength since the amount of steel to be used is reduced due to miniaturization and thinning of various devices. In addition, it is possible to expect cost reduction by a reduction in the number of joint components such as pipes or the like in the case where a welded structure is employed for each device of the hydrogen station. Moreover, it is possible to expect further cost reduction in the case where pipes or the like can be changed from the current (existing) seamless pipes to TIG welded pipes.

The SUS316 austenitic stainless steel described in the exemplary criteria is expensive since it contains a large amount of Ni and Mo which are rare metals. Furthermore, since a solutionized material does not satisfy a tensile strength required for high-pressure hydrogen pipes, it is used after being cold-worked. However, welds (welded portions) cannot be subjected to cold working.

The stainless steel disclosed in Patent Document 1 (PCT International Publication No. 2013/005570) is a stainless steel for a high-pressure hydrogen gas attaining high-strengthening by solid solution strengthening of N. It has a higher strength than the SUS316 stainless steel while securing good weldability and hydrogen embrittlement resistance characteristics. However, since the Ni amount and the Cr amount of the stainless steel described in Patent Document 1 are substantially 10% or greater and 20% or greater, respectively, the stainless steel described in Patent Document 1 is expensive.

Patent Document 2 (Japanese Unexamined Patent Application, First Publication No. 2009-133001) discloses a stainless steel whose hydrogen embrittlement resistance characteristics is improved by utilizing Ti and Nb carbonitrides having a size of 1 μm or greater. The stainless steel described in Patent Document 2 is excellent in economic efficiency since the addition of Mo is omitted as compared to the SUS316 stainless steel. However, the tensile strength thereof is at the same level as the SUS316 stainless steel.

Patent Document 3 (Japanese Unexamined Patent Application, First Publication No. 2014-047409) discloses a stainless steel for hydrogen utilizing precipitation strengthening by an η-phase intermetallic compound. However, an additional heat treatment is required to precipitate the η-phase intermetallic compound, and it is difficult to apply this steel to a welded structure. In addition, since it is required to add 20% or greater of Ni in the stainless steel described in Patent Document 3, the alloy cost is large.

Patent Document 4 (Japanese Unexamined Patent Application, First Publication No. 2015-171729) discloses a welded joint of an austenitic stainless steel. In the technology described in Patent Document 4, component adjustment and heat input restriction during welding are performed to control the existence state of a δ-ferrite phase in a weld and to increase hydrogen embrittlement resistance characteristics. However, this finding is on the assumption of welding with a welding material, and not on the assumption of non-filler welding with no welding material.

Accordingly, in the case where a steel sheet for hydrogen is welded and used, non-filler weldability is needed as a new subject (problem to be solved).

PRIOR ART DOCUMENTS

Patent Documents

Patent Document 1: PCT International Publication No. 2013/005570

Patent Document 2: Japanese Unexamined Patent Application, First Publication No. 2009-133001

Patent Document 3: Japanese Unexamined Patent Application, First Publication No. 2014-047409

Patent Document 4: Japanese Unexamined Patent Application, First Publication No. 2015-171729

DISCLOSURE OF INVENTION

Problems to be Solved by the Invention

The present invention aims to provide an austenitic stainless steel for hydrogen which has excellent weldability together with non-filler weldability as a new subject, hydrogen resistance, and economic efficiency, a welded joint using the austenitic stainless steel, a device for hydrogen using the austenitic stainless steel, and a method for producing a welded joint.

Solutions for Solving the Problems

The invention has been completed based on the above findings, and the features of an aspect of the invention for solving the above problems is as follows.

[1] A high-Mn austenitic stainless steel for hydrogen having excellent weldability, the steel containing, by mass %: C: 0.3% or less, Si: 0.1% to 1.5%, Mn: 5.5% to 20%, P: 0.050% or less, S: 0.005% or less, Cr: 10% to 20%, Ni: 4.0% to 12%, N: 0.40% or less, Cu: 4.0% or less, O: 0.02% or less, and either one or both of Ca: 0.01% or less and Al: 0.3% or less, with a remainder being Fe and inevitable impurities, wherein the following Formula (1) is satisfied.

$$[Ni]+[Cu]+12.93[C]+1.11[Mn]+0.72[Cr]+0.88[Mo]-0.27[Si]+7.55[N] \geq 29.3 \quad \text{Formula (1)}$$

[Si], [Ni], [Cu], [C], [Mn], [Cr], [Mo], and [N] each represent an amount (mass %) of each element, and a value of an element which is not contained is set to 0.

[2] The high-Mn austenitic stainless steel for hydrogen having excellent weldability according to [1], further containing, by mass %: Mo: 2.0% or less.

[3] The high-Mn austenitic stainless steel for hydrogen having excellent weldability according to [1] or [2], further containing: one or more selected from the group consisting of Sn, Zn, and Pb such that the amounts thereof satisfy the following Formula (2).

$$1.2 \geq 29([S]+[P])+4[O]-18[Ca]-0.4[Al]-0.02[Si]+5([Sn]+[Zn]+[Pb]) \geq 0.18 \quad \text{Formula (2)}$$

[S], [P], [O], [Ca], [Al], [Si], [Sn], [Zn], and [Pb] each represent an amount (mass %) of each element, and a value of an element which is not contained is set to 0.

[4] The high-Mn austenitic stainless steel for hydrogen having excellent weldability according to any one of [1] to [3], further containing: one or more selected from the following groups:

first group: by mass %, one or more of Ti: 1.0% or less, Nb: 1.0% or less, V: 1.0% or less, and W: 1.0% or less,
second group: by mass %, Co: 1.0% or less, and
third group: by mass %, Sb: 0.01% or less.

[5] The high-Mn austenitic stainless steel for hydrogen having excellent weldability according to any one of [1] to [4], wherein the austenitic stainless steel is used in a high-pressure hydrogen gas and liquid hydrogen environment.

[6] A welded joint consisting of the austenitic stainless steel according to any one of [1] to [5], wherein by mass %, [Mn]: 8.0% to 25.0% and [Cu]: 2.0% to 8.0% are contained as a chemical composition at grain boundaries in a weld.

[7] A device for hydrogen including the austenitic stainless steel according to any one of [1] to [5], wherein the device for hydrogen is used in a high-pressure hydrogen gas and liquid hydrogen environment.

[8] The device for hydrogen according to [7], which is any one of the group consisting of a tank body, a liner, a pipe, a valve, a steel sheet, and a heat exchanger.

[9] A device for hydrogen including: the welded joint according to [6], wherein the device for hydrogen is used in a high-pressure hydrogen gas and liquid hydrogen environment.

[10] The device for hydrogen according to [9], which is any one of the group consisting of a tank body, a liner, a pipe, a valve, a steel sheet, and a heat exchanger.

[11] A method for producing a welded joint, the method including: a step of welding the austenitic stainless steel according to any one of [1] to [5]; and a step of performing a heat treatment at a temperature of 900° C. to 980° C. for 1 to 10 minutes, wherein through the heat treatment, grain boundaries in which by mass %, [Mn]: 8.0% to 25.0% and [Cu]: 2.0% to 8.0% are contained as a chemical composition are obtained in a weld.

Effects of the Invention

According to an aspect of the invention, it is possible to provide a high-Mn austenitic stainless steel for hydrogen having excellent non-filler weldability together with hydrogen resistance and economic efficiency. In addition, it is possible to provide a welded joint and a device for hydrogen which have excellent hydrogen resistance by using the austenitic stainless steel.

The device for hydrogen is applicable to tank bodies, liners, pipes, valves, steel sheets, heat exchangers, or the like, and contributes to an improvement of hydrogen resistance thereof.

EMBODIMENTS FOR CARRYING OUT THE INVENTION

Hereinafter, embodiments of the invention will be described in detail.

In order to solve the above-described problems, the inventors have repeatedly conducted experiments and studies on the influences of various alloying elements on the weldability and hydrogen embrittlement resistance characteristics of an austenitic stainless steel, and completed the invention. The findings obtained in this embodiment will be described below.

(a) S, P, O, Sn, Zn, and Pb contained in an austenitic stainless steel increase a penetration depth of the steel during welding. That is, these have an effect of enhancing weldability.

Ca, Al, and Si contained in an austenitic stainless steel are essential elements for deoxidation of steel, but these reduce a penetration depth of the steel during welding. In the case where the penetration depth of the steel is excessively large, the steel is melted and dripped. In the case where the penetration depth of the steel is insufficient, a gap is generated between the base materials to be welded, and a welded joint has an insufficient strength.

Accordingly, a high-Mn austenitic stainless steel (austenitic stainless steel containing a large amount of Mn) for hydrogen according to this embodiment preferably has a basic composition containing, by mass %, C: 0.3% or less, Si: 0.1% to 1.5%, Mn: 5.5% to 20%, P: 0.050% or less, S: 0.005% or less, Cr: 10% to 20%, Ni: 4.0% to 12%, N: 0.40% or less, Cu: 4.0% or less, O: 0.02% or less, and either one or both of Ca: 0.01% or less and Al: 0.3% or less.

(b) In the case where excessive amounts of S, P, O, Sn, Zn, and Pb are added to an austenitic stainless steel, solidification cracking occurs during welding. Accordingly, a component range in which excellent weldability can be exhibited has been investigated, and as a result, it has been newly found that it is important to satisfy the following Formula (2) while satisfying the above-described basic composition range in the austenitic stainless steel.

$$1.2 \geq 29([S]+[P])+4[O]-18[Ca]-0.4[Al]-0.02[Si]+5([Sn]+[Zn]+[Pb]) \geq 0.18 \quad \text{Formula (2)}$$

[S], [P], [O], [Ca], [Al], [Si], [Sn], [Zn], and [Pb] each represent an amount (mass %) of each element, and the value of an element which is not contained is set to 0.

(c) With respect to hydrogen resistance of an austenitic stainless steel, a component range in which the hydrogen resistance can be exhibited has been investigated with regard to the influences of various alloying elements, and as a result, it has been newly found that it is important to satisfy the following Formula (1) while satisfying the above-described basic composition range.

$$[Ni]+[Cu]+12.93[C]+1.11[Mn]+0.72[Cr]+0.88[Mo]-0.27[Si]+7.55[N] \geq 29.3 \quad \text{Formula (1)}$$

[Ni], [Cu], [C], [Mn], [Cr], [Mo], [Si], and [N] each represent an amount (mass %) of each element, and the value of an element which is not contained is set to 0.

(d) In the case where a steel is exposed to high-pressure hydrogen for a long time in a hydrogen station or the like, the hydrogen intrudes into the steel. Since the grain size in a weld is larger than that in a base material portion, the hydrogen easily intrudes into grain boundaries. However, the inventors have newly found that segregation of the hydrogen can be suppressed in the case where Cu and Mn are segregated at grain boundaries in a weld in advance, and Cu easily segregates at grain boundaries, and Mn has a strong interaction with Cu and segregates with Cu at grain boundaries. That is, since Mn and Cu are segregated at and fill sites into which the hydrogen existing at the grain boundaries in the weld may intrude, the intrusion of the hydrogen can be prevented.

In contrast, excessive segregation of the elements (Mn, Cu) at grain boundaries weakens a grain boundary strength, and promotes grain boundary fractures. Accordingly, [Mn]: 8.0% to 25.0% and [Cu]: 2.0% to 8.0% are preferably contained by mass % as a chemical composition at the grain boundaries in the weld.

Mn and Cu contained in grain boundaries can be figured out by observing a fracture surface of the grain boundary with an analyzer such as an Auger electron spectroscopy (AES) analyzer and specifying the mass % of Mn and Cu contained in the fracture surface.

(e) Through the studies of the inventors, it has been found that in order to obtain a chemical composition in which Mn and Cu described above are contained in specific amounts at the grain boundaries in the weld, it is necessary to subject the weld to a heat treatment. In a high-Mn austenitic stainless steel, the peak of grain boundary segregation (segregation at grain boundaries) of Mn and Cu is 950° C. By segregating Mn and Cu at the grain boundaries in advance, it is possible to prevent the hydrogen that has intruded into the steel from being trapped at the grain boundaries, and to suppress fractures caused by hydrogen and originating from the grain boundaries. Accordingly, a heat treatment is preferably performed at a temperature of this embodiment (900° C. to 980° C.) for 1 minute or longer. In the case where the steel is heat-treated for 3 minutes or longer, grain boundary segregation concentrations of Mn and Cu (segregation concentrations of Mn and Cu at grain boundaries) are saturated. Accordingly, the upper limit of the heat treatment time is preferably set to 10 minutes or shorter since the productivity is reduced in the case where the heat treatment is performed for an excessive amount of time.

Accordingly, in order to obtain a targeted welded joint of this embodiment consisting of a high-Mn austenitic stainless steel which has excellent non-filler weldability and is excellent in hydrogen resistance and economic efficiency, a stainless steel satisfying a desirable composition to be described below is preferably subjected to a heat treatment at a temperature of 900° C. to 980° C. for 1 to 10 minutes after welding.

Hereinafter, the features of this embodiment will be described in detail. The symbol "%" for expressing the amount of each element means "mass %". In the case where the range of the amount of each element is expressed using "to", the upper limit and the lower limit thereof are included unless otherwise specified. Accordingly, the expression 0.1% to 1.5% means that the range is 0.1% or more and 1.5% or less.

<C: 0.3% or Less>

C is an effective element for stabilization of an austenite phase, and contributes to an improvement of hydrogen embrittlement resistance characteristics. In addition, C contributes to an increase of a strength of a steel by solid solution strengthening. In order to obtain these effects, the amount of C is preferably 0.01% or greater. In the case where C is contained in an excessive amount, precipitation of a Cr-based carbide at grain boundaries is promoted during welding, and corrosion resistance and toughness of a weld are reduced. Accordingly, the upper limit of the amount of C is required to be 0.3%. The upper limit of the amount of C is more preferably 0.2%.

<Si: 0.1% to 1.5%>

Si is an effective element for stabilization of an austenite phase, and contributes to an improvement of hydrogen embrittlement resistance characteristics. In addition, Si has a deoxidizing effect at the time of smelting. In order to obtain these effects, the amount of Si is required to be 0.1% or greater. The amount of Si is more preferably 0.3% or greater. In the case where Si is contained in an excessive amount, the formation of an intermetallic compound such as G phase or the like is promoted, and hot workability and toughness are reduced. During welding, a temperature at which the liquid phase remains is lowered, and thus the formation of cracks is promoted. Accordingly, the upper limit of the amount of Si is required to be 1.5%. The upper limit of the amount of Si is more preferably 1.1%.

<Mn: 5.5% to 20%>

Mn is an effective element for stabilization of an austenite phase, and contributes to an improvement of hydrogen embrittlement resistance characteristics. Moreover, Mn increases a solid solubility limit of N, and thus indirectly contributes to high-strengthening. In order to obtain these effects, the amount of Mn is required to be 5.5% or greater. The amount of Mn is more preferably 7.5% or greater. In the case where Mn is contained in an excessive amount, the formation of E phase having high hydrogen embrittlement sensitivity is promoted, and hydrogen embrittlement resistance characteristics is reduced. Accordingly, the upper limit of the amount of Mn is required to be 20%. The upper limit of the amount of Mn is more preferably 16%.

<P: 0.050% or Less>

P is an element which increases a penetration depth during welding, and is preferably contained in an amount of 0.010% or greater in order to obtain the above-described effect. In the case where P is added in an excessive amount, the formation of cracks is promoted during welding. Accordingly, the upper limit of the amount of P is required to be 0.050%. The upper limit of the amount of P is more preferably 0.030%.

<S: 0.005% or Less>

S is an element which increases a penetration depth during welding, and is preferably contained in an amount of 0.0002% or greater in order to obtain the above-described effect. In the case where S is added in an excessive amount, the formation of cracks is promoted during welding. Moreover, hot workability is reduced. Accordingly, the upper limit of the amount of S is required to be 0.005% or less, and more preferably 0.004% or less.

<Cr: 10% to 20%>

Cr is an essential element for obtaining corrosion resistance that is required for stainless steel. In addition, Cr contributes to high-strengthening of an austenitic stainless steel. In order to obtain these effects, the amount of Cr is required to be 10% or greater. The amount of Cr is more preferably 13% or greater. In the case where Cr is contained in an excessive amount, precipitation of a Cr-based carbonitride at grain boundaries is promoted during welding, and corrosion resistance and toughness of a weld are reduced. Accordingly, the upper limit of the amount of Cr is required to be 20% or less. The upper limit of the amount of Cr is more preferably 18% or less.

<Ni: 4.0% to 12%>

Ni is an effective element for greatly improving hydrogen embrittlement resistance characteristics of an austenitic stainless steel. In order to sufficiently obtain this effect, the amount of Ni is required to be 4.0% or greater. The amount of Ni is preferably 5.0% or greater. In the case where Ni is added in an excessive amount, the material cost is increased. Accordingly, the upper limit of the amount of Ni is set to be 12%. The upper limit is more preferably 8.0% or less.

<N: 0.40% or Less>

N is an effective element for stabilization of an austenite phase and an improvement of corrosion resistance. In addition, N contributes to an increase of a strength by solid solution strengthening. In order to obtain these effects, the amount of N is preferably 0.01% or greater. The amount of N is preferably 0.03% or greater. In the case where N is contained in an excessive amount, excessive formation of a Cr-based nitride is promoted, and hydrogen embrittlement resistance characteristics, corrosion resistance, and toughness of the austenite phase are reduced. Accordingly, the upper limit of the amount of N is required to be 0.40%. The amount of N is more preferably 0.30% or less.

<Cu: 4.0% or Less>

Cu is an effective element for stabilization of an austenite phase. In order to improve the hydrogen embrittlement resistance characteristics by stabilization of the austenite phase, the amount of Cu is preferably 0.2% or greater. In the case where Cu is added in an excessive amount, the strength is reduced, and hot workability is also impaired. Accordingly, the upper limit of the amount of Cu is required to be 4.0%. The amount of Cu is more preferably 3.0% or less.

<O: 0.02% or Less>

O is an element which increases a penetration depth of a steel during welding. Accordingly, O is required to be contained in an amount of 0.0010% or greater. The amount of O is preferably 0.0015% or greater. Since O forms an oxide in the steel, it reduces hot workability and toughness of an austenite phase. Accordingly, the upper limit of the amount of O (oxygen) is required to be limited to 0.02% or less. The amount of O is preferably 0.010% or less.

<Ca: 0.01% or Less>

Ca is an effective element for deoxidation and an improvement of hot workability. Accordingly, the lower limit of the amount is preferably 0.0001% or greater. In the case where Ca is added in an excessive amount, a penetration depth of a steel during welding is reduced, and the producing cost is greatly increased. Accordingly, the upper limit of the amount of Ca is required to be 0.01% or less. The upper limit is more preferably 0.008% or less.

<Al: 0.3% or Less>

Al is an effective element for deoxidation and an improvement of hot workability. Accordingly, the lower limit of the amount is preferably 0.001% or greater. In the case where Al is added in an excessive amount, a penetration depth of a steel during welding is reduced, and the producing cost is greatly increased. Accordingly, the upper limit of the amount of Al is required to be 0.3% or less. The upper limit is more preferably 0.2% or less.

Either one or both of Ca and Al are preferably contained such that the amounts thereof are within the ranges as described above.

$$<[Ni]+[Cu]+12.93[C]+1.11[Mn]+0.72[Cr]+0.88[Mo]-0.27[Si]+7.55[N] \geq 29.3 \quad \text{Formula (1)}>$$

Formula (1) is a mathematical expression of the degree of contribution of various elements with respect to hydrogen embrittlement resistance characteristics in a high-Mn austenitic stainless steel. In the case where the value of Formula (1) is 29.3 or greater, good hydrogen resistance is exhibited. The lower limit thereof is more preferably 30.0. In Formula (1), the symbols in the square brackets each represent a numerical value of an amount (mass %) of each element, and the value of an element which is not contained is set to 0.

The following elements may be contained as necessary.

<Mo: 2.0% or Less>

Mo is an element contributing to an increase of a strength and an improvement of corrosion resistance of an austenitic stainless steel. However, the addition of Mo leads to an increase of the alloy cost. Furthermore, Mo promotes the formation of δ-ferrite phase, and this leads to a reduction of hydrogen embrittlement resistance characteristics. Accordingly, Mo can be added as necessary, and in that case, the amount of Mo is preferably 2.0% or less. Mo is an element which is inevitably mixed from the scrap raw material. In the case where the amount of Mo is excessively reduced, the melting raw material is restricted, and this leads to an increase of the producing cost. Accordingly, in the case where Mo is not intentionally added, the lower limit of the amount of Mo is 0%, and the upper limit of the amount of Mo is preferably 0.05%.

$$<1.2 \geq 29([S]+[P])+4[O]-18[Ca]-0.4[Al]-0.02[Si]+5([Sn]+[Zn]+[Pb]) \geq 0.18 \quad \text{Formula (2)}>$$

One or more selected from the group consisting of Sn, Zn, and Pb may be contained such that the amounts thereof satisfy Formula (2).

Formula (2) is a mathematical expression of the degree of contribution of various elements with respect to weldability. All of Sn, Zn, and Pb evaporate from the melted portion during welding and increase the current density of the arc; and thereby, a penetration depth of the steel is increased. Accordingly, it is preferable that Sn is contained in an amount of 0.001% or greater, Pb is contained in an amount of 0.0001% or greater, and Zn is contained in an amount of 0.0003% or greater. In Formula (2), the symbols in the square brackets each represent a numerical value of an amount (mass %) of each element, and the value of an element which is not contained is set to 0.

In the case where these elements are added in excessive amounts, a grain boundary strength of the weld is weakened, and grain boundary fractures are promoted when hydrogen is contained. Accordingly, it is preferable that the upper limit of the amount of Sn is 0.01% or less, the upper limit of the amount of Pb is 0.001% or less, and the upper limit of the amount of Zn is 0.002% or less.

Accordingly, the high-Mn austenitic stainless steel according to this embodiment preferably contains one or more selected from Sn, Pb, and Zn, and it is preferable that the amount of Sn is in a range of 0.001% to 0.01%, the amount of Pb is in a range of 0.0001% to 0.001%, and the amount of Zn is in a range of 0.0003% to 0.002%.

In the case where Formula (2) is 0.18 or greater and 1.2 or less, the penetration depth of the steel during welding is sufficient, and a weld bead is confirmed on the back side of the steel. In the case where the value of Formula (2) exceeds 1.2, that is the upper limit shown in the above-described formula, the penetration during welding is excessive, and the steel may be melted and dripped. In the case where the value of Formula (2) is less than 0.18, that is the lower limit shown in the above-described formula, the penetration during welding is insufficient, and no weld bead is confirmed on the back side of the steel.

<Ti, Nb, V, and W: 1.0% or Less>

Ti, Nb, V and W are elements which are solid-solubilized or precipitated as carbonitrides in a steel, and are effective for increasing a strength. One or more elements selected from these may be contained as necessary. In the case where the amount of each of Ti, Nb, V, and W is greater than 1.0%, the generated carbonitride thereof reduces the productivity during hot working. Accordingly, in the case where Ti, Nb, V, and W are contained, it is necessary to set the upper limit of the amount of each of Ti, Nb, V, and W to be 1.0% or less. The upper limit of the amount of each of Ti, Nb, V, and W is preferably 0.5% or less.

<Co: 1.0% or Less>

Co is an effective element for an improvement of corrosion resistance, and may be contained as necessary. In order to obtain this effect, Co is preferably contained in an amount of 0.04% or greater. In the case where Co is contained in an excessive amount, the formation of a strain-induced martensite phase is promoted, and hydrogen embrittlement resistance characteristics is reduced. Accordingly, the upper limit of the amount of Co is required to be 1.0% or less. The upper limit of the amount of Co is preferably 0.8% or less.

<Sb: 0.01% or Less>

Sb is an effective element for an improvement of oxidation resistance, and may be contained as necessary. In order to obtain this effect, Sb is preferably contained in an amount of 0.0005% or greater. In the case where Sb is contained in an excessive amount, hot workability is reduced. Accordingly, the upper limit of the amount of Sb is required to be 0.01% or less. The upper limit of the amount of Sb is preferably 0.008% or less.

Next, a method for producing a welded joint consisting of a high-Mn austenitic stainless steel having the above-described composition will be described below.

In producing a welded joint, the welding method is not particularly limited, and non-filler welding such as tungsten inert gas (TIG) welding or laser welding is preferable. The peak of grain boundary segregation of Mn and Cu is 950° C. at grain boundaries in a weld of the high-Mn austenitic stainless steel. By segregating Mn and Cu at the grain boundaries in advance, it is possible to prevent the hydrogen that has intruded into the steel from being trapped at the grain boundaries, and to suppress fractures caused by hydrogen and originating from the grain boundaries.

Accordingly, a heat treatment is preferably performed at a temperature of this embodiment (900° C. to 980° C.) for 1 minute or longer after welding. In the case where the steel is heat-treated for 3 minutes or longer, grain boundary segregation concentrations of Mn and Cu are saturated. Accordingly, the upper limit of the heat treatment time is preferably set to 10 minutes or shorter since the productivity is reduced in the case where the heat treatment is performed for an excessive amount of time.

The heat treatment temperature can be selected within a range of 900° C. to 980° C. It is preferable that the heat treatment time is set to be in a range of 1 to 10 minutes while the temperature is selected to be within the range of 900° C. to 980° C.

In the case where the heat treatment temperature is lower than 900° C., the heat treatment time is required to be longer than 10 minutes, and the grain boundary segregation concentration becomes too low. In the case where the heat treatment temperature is higher than 980° C., Mn and Cu do not sufficiently segregate at the grain boundaries in the weld.

[Mn]: 8.0% to 25.0% and [Cu]: 2.0% to 8.0% are preferably contained by mass % as a chemical composition at the grain boundaries in the weld. That is, the amount of Mn is preferably 8.0% to 25.0%, and the amount of Cu is preferably 2.0% to 8.0% in the chemical composition of the grain boundaries in the weld. In the case where the above-described heat treatment is performed, the amounts of Mn and Cu at the grain boundaries in the weld can be suitably adjusted within the above-described ranges, respectively.

In the case where Mn and Cu are segregated at the grain boundaries within the above-described ranges, respectively, hydrogen is hardly trapped even in the case where the hydrogen intrudes into the grain boundaries from the environment as described above, and thus it is possible to suppress fractures caused by hydrogen and originating from the grain boundaries.

Particularly good hydrogen resistance can be provided in the case where the amount of Mn is set to be in a range of 10.0% to 25.0% in the above-described range, and the amount of Cu is set to be in a range of 3.0% to 8.0% in the above-described range.

According to the high-Mn austenitic stainless steel described above, since basic elements such as C, Si, Mn, P, S, Cr, Ni, Mo, N, and Cu are contained within the specified ranges, respectively, and the amounts of expensive Ni and Cr are less than those in a conventional alloy, the high-Mn austenitic stainless steel is excellent in economic efficiency.

In addition, Ni, Cu, C, Mn, Cr, Mo, Si, and N are contained with balance such that the amounts thereof satisfy Formula (1). Accordingly, a composition is provided in which hydrogen resistance can be exhibited, and thus it is possible to realize a stainless steel having excellent hydrogen resistance.

In addition, S, P, O, Ca, Al, Si, Sn, Zn, and Pb are contained with balance such that the amounts thereof satisfy Formula (2). Accordingly, it is possible to prevent solidification cracking during welding, and thus excellent weldability can be secured with an appropriate penetration depth of the steel during welding, and an excellent welding strength can be obtained. Accordingly, it is possible to provide an austenitic stainless steel and a welded joint having the above-described effects.

Furthermore, if it is possible to provide a composition in which Cu and Mn are segregated in appropriate amounts at the grain boundaries in the weld, then in the case where the austenitic stainless steel is used for devices for hydrogen (hydrogen devices) such as liquid hydrogen tank bodies for hydrogen stations or the like, liners, pipes, valves, steel sheets, heat exchangers, or the like, a probability that hydrogen is trapped at the grain boundaries is reduced even when the hydrogen intrudes into the grain boundaries in the weld, and thus hydrogen embrittlement resistance characteristics is improved.

Accordingly, in the case where the austenitic stainless steel is used for devices for hydrogen such as liquid hydrogen tank bodies for hydrogen stations or the like, liners, pipes, valves, steel sheets, heat exchangers, or the like, it is possible to provide a device for hydrogen in which hydrogen-induced cracks are hardly generated.

EXAMPLES

Hereinafter, the invention will be described in more detail based on examples.

Stainless steel test materials having chemical components shown in Tables 1 to 4 were melted in a laboratory to produce cast steels having a thickness of 50 mm. Then, the cast steels were heated at 1,200° C. and hot-rolled to produce hot-rolled sheets having a thickness of 6 mm. The hot-rolled sheets were heat-treated at 1,180° C., and then cold-rolled such that a thickness thereof was 2 mm. The sheets were further heat-treated at 1,050° C. for 30 s (seconds), and then air-cooled to obtain cold-rolled annealed sheets.

TABLE 1

(mass %)

| Steel Type | C | Si | Mn | P | S | Cr | Ni | Mo | N | Cu |
|---|---|---|---|---|---|---|---|---|---|---|
| 1 | 0.060 | 0.51 | 9.58 | 0.030 | 0.0003 | 15.18 | 6.03 | 0.21 | 0.157 | 2.61 |
| 2 | 0.064 | 0.50 | 9.29 | 0.015 | 0.0005 | 15.21 | 6.35 | 0.00 | 0.179 | 2.21 |
| 3 | 0.045 | 0.72 | 13.51 | 0.023 | 0.0007 | 14.50 | 10.70 | 0.00 | 0.165 | 1.97 |
| 4 | 0.061 | 0.49 | 9.24 | 0.029 | 0.0042 | 15.37 | 6.07 | 0.19 | 0.194 | 2.55 |
| 5 | 0.110 | 0.24 | 10.00 | 0.023 | 0.0012 | 13.40 | 7.22 | 0.38 | 0.163 | 0.00 |
| 6 | 0.070 | 1.00 | 9.90 | 0.021 | 0.0033 | 18.80 | 6.91 | 0.09 | 0.039 | 2.27 |
| 7 | 0.062 | 0.64 | 7.80 | 0.025 | 0.0008 | 15.11 | 6.66 | 1.50 | 0.128 | 0.50 |
| 8 | 0.034 | 0.55 | 8.30 | 0.035 | 0.0029 | 14.61 | 7.91 | 0.00 | 0.198 | 0.00 |
| 9 | 0.049 | 0.46 | 9.55 | 0.028 | 0.0004 | 16.18 | 4.32 | 1.27 | 0.044 | 2.87 |
| 10 | 0.063 | 0.16 | 8.99 | 0.025 | 0.0035 | 13.29 | 5.63 | 0.05 | 0.331 | 1.28 |
| 11 | 0.055 | 0.19 | 9.23 | 0.022 | 0.0018 | 15.15 | 6.10 | 0.00 | 0.172 | 3.15 |
| 12 | 0.059 | 0.15 | 9.04 | 0.005 | 0.0002 | 16.50 | 6.22 | 1.23 | 0.189 | 1.24 |
| 13 | 0.092 | 0.41 | 11.70 | 0.020 | 0.0007 | 17.67 | 6.57 | 0.06 | 0.301 | 0.12 |
| 14 | 0.049 | 0.53 | 9.12 | 0.029 | 0.0009 | 16.19 | 6.49 | 0.21 | 0.242 | 2.50 |
| 15 | 0.065 | 0.30 | 10.23 | 0.024 | 0.0003 | 17.10 | 6.71 | 0.11 | 0.292 | 0.20 |
| 16 | 0.031 | 0.68 | 9.69 | 0.034 | 0.0012 | 15.92 | 7.48 | 0.45 | 0.189 | 1.36 |
| 17 | 0.060 | 0.49 | 9.90 | 0.018 | 0.0017 | 14.91 | 5.92 | 0.08 | 0.069 | 0.89 |
| 18 | 0.060 | 0.51 | 9.02 | 0.031 | 0.0003 | 15.18 | 7.10 | 0.12 | 0.192 | 1.00 |

TABLE 2

(mass %)

| Steel Type | O | Ca | Al | Sn | Zn | Pb | Others | Formula (1) | Formula (2) |
|---|---|---|---|---|---|---|---|---|---|
| 1 | 0.0018 | 0.0039 | 0.035 | 0.008 | 0.0005 | 0.0001 | | 32.2 | 0.83 |
| 2 | 0.0029 | 0.0016 | 0.019 | 0.002 | 0.0008 | 0.0001 | | 31.9 | 0.43 |
| 3 | 0.0015 | 0.0005 | 0.001 | 0.000 | 0.0000 | 0.0000 | | 39.7 | 0.67 |
| 4 | 0.0054 | 0.0001 | 0.005 | 0.001 | 0.0012 | 0.0002 | | 32.2 | 0.98 |
| 5 | 0.0034 | 0.0045 | 0.012 | 0.010 | 0.0000 | 0.0000 | | 30.9 | 0.67 |
| 6 | 0.0030 | 0.0056 | 0.045 | 0.000 | 0.0160 | 0.0000 | | 34.7 | 0.66 |
| 7 | 0.0058 | 0.0003 | 0.004 | 0.020 | 0.0000 | 0.0004 | | 29.6 | 0.85 |
| 8 | 0.0019 | 0.0040 | 0.036 | 0.005 | 0.0009 | 0.0000 | | 29.4 | 1.04 |
| 9 | 0.0022 | 0.0024 | 0.065 | 0.000 | 0.0000 | 0.0080 | | 31.4 | 0.79 |
| 10 | 0.0085 | 0.0033 | 0.026 | 0.000 | 0.0025 | 0.0045 | | 29.8 | 0.82 |
| 11 | 0.0035 | 0.0027 | 0.016 | 0.000 | 0.0000 | 0.0005 | | 32.4 | 0.65 |
| 12 | 0.0011 | 0.0001 | 0.001 | 0.000 | 0.0000 | 0.0000 | | 32.6 | 0.15 |
| 13 | 0.0014 | 0.0027 | 0.026 | 0.002 | 0.0002 | 0.0001 | V: 0.11, W: 0.02 | 35.8 | 0.55 |
| 14 | 0.0018 | 0.0031 | 0.029 | 0.008 | 0.0015 | 0.0002 | Ti: 0.14 | 33.3 | 0.84 |
| 15 | 0.0031 | 0.0004 | 0.023 | 0.008 | 0.0000 | 0.0009 | Nb: 0.25 | 33.6 | 0.74 |
| 16 | 0.0023 | 0.0048 | 0.031 | 0.001 | 0.0005 | 0.0004 | Ti: 0.59, W: 0.62 | 33.1 | 0.93 |
| 17 | 0.0018 | 0.0039 | 0.035 | 0.008 | 0.0005 | 0.0005 | Co: 0.58 | 29.8 | 0.53 |
| 18 | 0.0018 | 0.0039 | 0.023 | 0.000 | 0.0000 | 0.0000 | Sb: 0.006 | 31.2 | 0.83 |

TABLE 3

(mass %)

| Steel Type | C | Si | Mn | P | S | Cr | Ni | Mo | N | Cu |
|---|---|---|---|---|---|---|---|---|---|---|
| 19 | 0.059 | 0.51 | <u>21.73</u> | 0.027 | 0.0003 | 15.18 | 6.13 | 0.19 | 0.159 | 2.51 |
| 20 | 0.019 | 0.79 | 7.66 | 0.031 | 0.0015 | 13.90 | 5.75 | 0.26 | 0.058 | 0.27 |
| 21 | 0.046 | 0.87 | 8.20 | 0.038 | 0.0008 | <u>22.35</u> | 5.12 | 0.01 | 0.208 | 2.33 |
| 22 | 0.057 | 0.45 | 9.43 | 0.039 | 0.0039 | 15.18 | 7.55 | 1.90 | 0.180 | 1.81 |
| 23 | 0.065 | 0.23 | 8.89 | 0.025 | 0.0009 | 16.78 | <u>3.52</u> | 0.01 | 0.165 | 2.59 |
| 24 | 0.050 | 1.25 | 9.02 | 0.012 | 0.0002 | 15.23 | 6.21 | 1.25 | 0.189 | 1.95 |
| 25 | 0.049 | 0.62 | 10.10 | 0.025 | 0.0014 | 14.45 | 6.72 | 0.01 | <u>0.441</u> | 2.18 |
| 26 | 0.054 | 1.25 | 9.56 | <u>0.055</u> | 0.0003 | 16.11 | 6.29 | 1.32 | 0.056 | 2.20 |
| 27 | 0.061 | 0.55 | 9.12 | 0.031 | 0.0015 | 15.67 | 6.28 | 0.01 | 0.178 | 2.16 |

TABLE 4

| Steel Type | O | Ca | Al | Sn | Zn | Pb | Others | Formula (1) | Formula (2) (mass %) |
|---|---|---|---|---|---|---|---|---|---|
| 19 | 0.0018 | 0.0040 | 0.031 | 0.008 | 0.0000 | 0.0002 | | 45.7 | 0.75 |
| 20 | 0.0036 | 0.0045 | 0.042 | 0.002 | 0.0007 | 0.0000 | | 25.2 | 0.86 |
| 21 | 0.0032 | 0.0018 | 0.017 | 0.004 | 0.0015 | 0.0000 | | 34.6 | 1.11 |
| 22 | 0.0089 | 0.0055 | 0.004 | 0.009 | 0.0000 | 0.0018 | Ti: 0.12 | 34.4 | 1.22 |
| 23 | 0.0028 | 0.0005 | 0.021 | 0.009 | 0.0015 | 0.0000 | | 30.1 | 0.79 |
| 24 | 0.0015 | 0.0080 | 0.190 | 0.000 | 0.0000 | 0.0003 | | 32.0 | 0.12 |
| 25 | 0.0056 | 0.0011 | 0.002 | 0.011 | 0.0000 | 0.0005 | Co: 0.25 | 34.3 | 0.81 |
| 26 | 0.0012 | 0.0075 | 0.150 | 0.000 | 0.0019 | 0.0000 | | 32.6 | 1.40 |
| 27 | 0.0072 | 0.0150 | 0.100 | 0.014 | 0.0000 | 0.0007 | | 31.8 | 0.72 |

The obtained cold-rolled annealed sheets were used as test materials to evaluate weldability. The weld heat input was 5 kJ/cm, and welded joints were produced by butt TIG welding. A back surface of the welded joint was visually observed, and the test material in which a back-bead width was 1.0 mm or greater was evaluated as "A" (excellent). "A" denotes that the weldability thereof was extremely good. The test material in which a back-bead width was 0.5 mm or greater was evaluated as "B" (good, fair, or pass). "B" denotes that the weldability thereof was acceptable (passed). The test material in which a back-bead width was less than 0.5 mm or the test material in which melting and dripping occurred was evaluated as "C" (poor or fail). "C" denotes that the weldability thereof was rejectable (failed).

Hydrogen resistance evaluation was performed on the test materials having acceptable weldability. A JIS13-B tensile test piece was collected such that the weld was positioned at the center of the parallel portion of the test piece. The tensile test piece was exposed to a 95 MPa-hydrogen environment at 300° C. for 72 hours to allow the hydrogen to intrude into the steel. After completion of the exposure test, the test piece was kept frozen until just before the tensile test.

As a comparative material (comparative test piece), a JIS13-B tensile test piece was collected from the same test material such that the weld was positioned at the center of the parallel portion of the test piece. This comparison material was not exposed to hydrogen.

The tensile test was performed under the conditions where a test temperature was −40° C., a test environment was the atmosphere (air), and a strain rate was $5 \times 10^{-5}$/s.

A value of "(breaking elongation (total elongation) of test piece exposed to hydrogen/breaking elongation (total elongation) of test piece not exposed to hydrogen)×100(%)" was calculated. The test material in which the value was 80% or greater was evaluated as "B" (good, fair, or pass). "B" denotes that the hydrogen embrittlement resistance characteristics thereof was good. The test material in which the value was 90% or greater was evaluated as "A" (excellent). "A" denotes that the hydrogen embrittlement resistance characteristics thereof was extremely good. The test material in which the value was less than 80% was evaluated as "C" (poor or fail). "C" denotes that the hydrogen embrittlement resistance characteristics thereof was rejectable (failed).

Table 5 shows the results of the weldability test and the hydrogen resistance test together. "-" indicates that no test was performed. Tables 2 and 4 show the values calculated through Formula (1) and the values calculated through Formula (2) together.

Next, the welded joints consisting of steel types 2, 7, and 8 having acceptable weldability were heat-treated under the conditions of 950° C. and 10 seconds to 10 minutes, the conditions of 900° C. and 10 minutes, or the conditions of 980° C. and 1 minute. After the heat treatment, a small test piece having a length of 20 mm and a width of 5 mm in which a V-notch was introduced into the weld metal portion was cut out. The small test pieces was cooled with liquid nitrogen, and then was impacted by a hammer in an Auger electron spectroscopy (AES) analyzer; and thereby, grain boundaries appeared. Next, the Mn concentration and the Cu concentration at the grain boundaries were analyzed by the AES analysis. In this analysis, the Mn concentration means the mass % of Mn, and the Cu concentration means the mass % of Cu with respect to all detected elements.

Table 6 shows the results of measurement of the amount of Mn and the amount of Cu at the grain boundaries and the results of the hydrogen resistance test in the case where the heat treatment was performed under the conditions of 950° C. and 10 seconds to 10 minutes, the conditions of 900° C. and 10 minutes, or the conditions of 980° C. and 1 minute. The conditions of the hydrogen resistance test performed to obtain these results were the same as those of the above-described hydrogen resistance test.

TABLE 5

| | Steel Type | Weldability | Hydrogen Resistance |
|---|---|---|---|
| Invention Examples | 1 | A | A |
| | 2 | A | B |
| | 3 | B | A |
| | 4 | A | A |
| | 5 | A | B |
| | 6 | A | A |
| | 7 | A | B |
| | 8 | A | B |
| | 9 | A | B |
| | 10 | A | B |
| | 11 | A | B |
| | 12 | B | A |
| | 13 | B | A |
| | 14 | A | A |
| | 15 | A | A |
| | 16 | A | A |
| | 17 | A | B |
| | 18 | B | A |
| Comparative Examples | 19 | B | C |
| | 20 | B | C |
| | 21 | B | C |
| | 22 | C | — |
| | 23 | B | C |
| | 24 | C | — |
| | 25 | B | C |
| | 26 | C | — |
| | 27 | B | C |

The steel types 1 to 18 each having the composition shown in Tables 1 to 4 are samples satisfying the component range specified in this embodiment. The samples of the steel types 1 to 18 were good or extremely good in both the weldability and the hydrogen embrittlement resistance characteristics.

In addition, in the steel types 1 to 18 shown in Tables 1 to 4, the amount of Cr was 20% or less, the amount of expensive Mo was suppressed to be 1.5% or less (2.0% or less), and the amount of expensive Ni was suppressed to be about 4% to 11% (4.0% to 12%). Accordingly, the steel types 1 to 18 had higher economic efficiency than stainless steels of the prior art including SUS316 series containing large amounts of Ni, Cr, and Mo, and could exhibit excellent weldability and hydrogen resistance.

The amount of Mn of the steel type 19 was greater than the desirable range of this embodiment. As a result, hydrogen-induced brittle fractures originating from the ε phase generated during the tensile test were generated, and the hydrogen embrittlement resistance characteristics was rejected (failed).

The value of Formula (1) "[Ni]+[Cu]+12.93[C]+1.11 [Mn]+0.72[Cr]+0.88[Mo]−0.27[Si]+7.55[N]" of the steel type 20 was less than the desirable range of this embodiment. As a result, the deformation structural morphology of the austenite phase was susceptible to hydrogen, and thus ductility was reduced due to the hydrogen, and hydrogen embrittlement resistance characteristics was rejected (failed).

The amount of Cr of the steel type 21 was greater than the desirable range of this embodiment. As a result, a Cr-depleted layer was formed due to the formation of Cr-based precipitates during welding. Hydrogen-induced cracks originating from the Cr-deficient layer were generated, and thus ductility was reduced and rejected (failed).

The value of Formula (2) "29([S]+[P])+4[O]−18[Ca]−0.4 [Al]−0.02[Si]+5([Sn]+[Zn]+[Pb])" of the steel type 22 was greater than the range of this embodiment. As a result, the weld was melted and dripped during welding, and weldability was rejected (failed).

The amount of Ni of the steel type 23 was less than the desirable range of this embodiment. As a result, the deformation structural morphology of the austenite phase was susceptible to hydrogen, and thus ductility was reduced due to the hydrogen, and the hydrogen embrittlement resistance characteristics were rejected (failed).

The value of Formula (2) "29([S]+[P])+4[O]−18[Ca]−0.4 [Al]−0.02[Si]+5([Sn]+[Zn]+[Pb])" of the steel type 24 was less than the range of this embodiment. As a result, due to the insufficient penetration depth of the steel, the back bead width was less than 1 mm, and the weldability was rejected (failed).

The amount of N of the steel type 25 is greater than the desirable range of this embodiment. As a result, due to the influence of N-clusters formed in the austenite phase, the deformation structural morphology was susceptible to hydrogen. Ductility was reduced due to the hydrogen, and the hydrogen embrittlement resistance characteristics were rejected (failed).

The amount of P and the value of Formula (2) "29([S]+ [P])+4[O]−18[Ca]−0.4[Al]−0.02[Si]+5([Sn]+[Zn]+[Pb])" of the steel type 26 were greater than the desirable ranges of this embodiment, respectively. As a result, the weld was melted and dripped during welding, and the weldability was rejected (failed).

The amount of Ca of the steel type 27 was greater than the desirable range of this embodiment. As a result, hydrogen was locally concentrated at the interface between the Ca-based inclusion formed in the weld and the austenite phase. In the hydrogen-concentrated portion, cracks were generated, and thus ductility was reduced. In addition, the hydrogen embrittlement resistance characteristics were rejected (failed).

In view of these results, it is found that it is important for the high-Mn austenitic stainless steel to contain, by mass %, C: 0.3% or less, Si: 0.1% to 1.5% or less, Mn: 5.5% to 20% or less, P: 0.050% or less, S: 0.005% or less, Cr: 10% to 20%, Ni: 4.0% to 12%, N: 0.40% or less, Cu: 4.0% or less, O: 0.02% or less, and either one or both of Ca: 0.01% or less and Al: 0.3% or less and to satisfy Formula (1).

It is also found that it is important for the high-Mn austenitic stainless steel to contain, in addition to S, P, O, Ca, Al, and Si, one or more selected from the group consisting of Sn, Zn, and Pb such that the amounts thereof satisfy Formula (2).

TABLE 6

| Steel Type | Heat Treatment Temperature °C. | Heat Treatment Time | Mn Amount at Grain Boundaries (mass %) | Cu Amount at Grain Boundaries (mass %) | Hydrogen Resistance |
|---|---|---|---|---|---|
| 2 | 950 | 10 s | 9.67 | 2.78 | B |
|   |     | 1 min | 10.80 | 3.18 | A |
|   |     | 3 min | 12.80 | 5.90 | A |
|   |     | 5 min | 13.50 | 6.31 | A |
|   |     | 10 min | 13.60 | 6.31 | A |
| 7 | 950 | 10 s | 8.11 | 0.67 | B |
|   |     | 1 min | 10.24 | 3.23 | A |
|   |     | 3 min | 11.81 | 4.78 | A |
|   |     | 5 min | 12.04 | 5.89 | A |
|   |     | 10 min | 12.04 | 5.91 | A |
|   | 900 | 10 min | 10.37 | 3.45 | A |
|   | 980 | 1 min | 11.70 | 4.91 | A |
| 8 | 950 | 10 s | 8.65 | 0.32 | B |
|   |     | 1 min | 10.04 | 3.11 | A |
|   |     | 3 min | 12.12 | 4.53 | A |
|   |     | 5 min | 13.22 | 5.67 | A |
|   |     | 10 min | 13.27 | 5.68 | A |
|   | 900 | 10 min | 10.11 | 3.24 | A |
|   | 980 | 1 min | 13.28 | 5.70 | A |

As shown in the results in Table 6, in all the samples of the steel types 2, 7, and 8, more excellent hydrogen resistance was exhibited in the case where the heat treatment time was 1 minute to 10 minutes than that in the case where the heat treatment time was 10 s (seconds).

In any sample shown in Table 6, the amount of Mn existing at the grain boundaries in the weld was 8% or greater. In the samples subjected to the heat treatment for a heat treatment time of 1 to 10 minutes, the amount of Mn present at the grain boundaries in the weld was 10% or greater, and it is found that hydrogen resistance can be improved by segregating a large amount of Mn at the grain boundaries. In addition, in the samples subjected to the heat treatment for a heat treatment time of 1 to 10 minutes, the amount of Cu present at the grain boundaries in the weld was 3% or greater, and it is found that hydrogen resistance can be improved by segregating a large amount of Cu at the grain boundaries.

From the above-described results, it has been found that by segregating large amounts of Mn and Cu at the grain boundaries in the weld, segregation of hydrogen can be suppressed, and hydrogen resistance of a welded joint can be improved.

INDUSTRIAL APPLICABILITY

According to this embodiment, it is possible to provide an austenitic stainless steel with excellent weldability and hydrogen embrittlement resistance characteristics which is applicable to tank bodies for a high-pressure hydrogen gas and liquid hydrogen, liners, pipes, valves, steel sheets, heat exchangers, or the like, a welded joint using the austenitic stainless steel, a method for producing a welded joint, and a device for hydrogen using the stainless steel.

Accordingly, this embodiment can be suitably applied to welded joints and devices which are used in a high-pressure hydrogen gas and liquid hydrogen environment and producing steps thereof.

The invention claimed is:

1. A high-Mn austenitic stainless steel for hydrogen having excellent weldability, the steel comprising, by mass %: C: 0.3% or less, Si: 0.1% to 1.5%, Mn: 5.5% to 20%, P: 0.010% to 0.050%, S: 0.005% or less, Cr: 10% to 20%, Ni: 4.0% to 12%, N: 0.40% or less, Cu: 4.0% or less, O: 0.0010% to 0.02%, and either one or both of Ca: 0.0001% to 0.01% and Al: 0.3% or less, and further comprising: one or more selected from the group consisting of Sn: 0.001% or more, Zn: 0.0003% or more, and Pb: 0.0001% to 0.001% such that the amounts thereof satisfy the following Formula (2), with a remainder being Fe and inevitable impurities, wherein the following Formula (1) is satisfied:

[Ni]+[Cu]+12.93[C]+1.11[Mn]+0.72[Cr]+0.88[Mo]−0.27[Si]+7.55[N]≥29.3     Formula (1)

[Si], [Ni], [Cu], [C], [Mn], [Cr], [Mo], and [N] each represent an amount (mass %) of each element, and a value of an element which is not contained is set to 0, 0.85≥29([S]+[P])+4[O]−18[Ca]−0.4[Al]−0.02[Si]+5([Sn]+[Zn]+[Pb])≥0.18     Formula (2)

[S], [P], [O], [Ca], [Al], [Si], [Sn], [Zn], and [Pb] each represent an amount (mass %) of each element, and a value of an element which is not contained is set to 0.

2. The high-Mn austenitic stainless steel for hydrogen having excellent weldability according to claim 1, further comprising, by mass %: Mo: 2.0% or less.

3. The high-Mn austenitic stainless steel for hydrogen having excellent weldability according to claim 1, further comprising: one or more selected from the following groups:
first group: by mass %, one or more of Ti: 1.0% or less, Nb: 1.0% or less, V: 1.0% or less, and W: 1.0% or less,
second group: by mass %, Co: 1.0% or less, and
third group: by mass %, Sb: 0.01% or less.

4. The high-Mn austenitic stainless steel for hydrogen having excellent weldability according to claim 1,
wherein the high-Mn austenitic stainless steel is used in a high-pressure hydrogen gas and liquid hydrogen environment.

5. A welded joint consisting of:
the high-Mn austenitic stainless steel according to claim 1,
wherein by mass %, [Mn]: 8.0% to 25.0% and [Cu]: 2.0% to 8.0% are contained as a chemical composition at grain boundaries in a weld.

6. A device for hydrogen comprising:
the high-Mn austenitic stainless steel according to claim 1,
wherein the device for hydrogen is used in a high-pressure hydrogen gas and liquid hydrogen environment.

7. The device for hydrogen according to claim 6, which is any one of the group consisting of a tank body, a liner, a pipe, a valve, a steel sheet, and a heat exchanger.

8. A device for hydrogen comprising:
the welded joint according to claim 5,
wherein the device for hydrogen is used in a high-pressure hydrogen gas and liquid hydrogen environment.

9. The device for hydrogen according to claim 8, which is any one of the group consisting of a tank body, a liner, a pipe, a valve, a steel sheet, and a heat exchanger.

10. A method for producing a welded joint, the method comprising:
a step of welding the high-Mn austenitic stainless steel according to claim 1; and
a step of performing a heat treatment at a temperature of 900° C. to 980° C. for 1 to 10 minutes,
wherein through the heat treatment, grain boundaries in which by mass %, [Mn]: 8.0% to 25.0% and [Cu]: 2.0% to 8.0% are contained as a chemical composition are obtained in a weld.

11. The high-Mn austenitic stainless steel for hydrogen having excellent weldability according to claim 2, further comprising: one or more selected from the following groups:
first group: by mass %, one or more of Ti: 1.0% or less, Nb: 1.0% or less, V: 1.0% or less, and W: 1.0% or less,
second group: by mass %, Co: 1.0% or less, and
third group: by mass %, Sb: 0.01% or less.

12. The high-Mn austenitic stainless steel for hydrogen having excellent weldability according to claim 2,
wherein the high-Mn austenitic stainless steel is used in a high-pressure hydrogen gas and liquid hydrogen environment.

13. The high-Mn austenitic stainless steel for hydrogen having excellent weldability according to claim 3,
wherein the high-Mn austenitic stainless steel is used in a high-pressure hydrogen gas and liquid hydrogen environment.

14. A welded joint consisting of:
the high-Mn austenitic stainless steel according to claim 2,
wherein by mass %, [Mn]: 8.0% to 25.0% and [Cu]: 2.0% to 8.0% are contained as a chemical composition at grain boundaries in a weld.

15. A welded joint consisting of:
the high-Mn austenitic stainless steel according to claim 3,
wherein by mass %, [Mn]: 8.0% to 25.0% and [Cu]: 2.0% to 8.0% are contained as a chemical composition at grain boundaries in a weld.

16. A welded joint consisting of:
the high-Mn austenitic stainless steel according to claim 15,
wherein by mass %, [Mn]: 8.0% to 25.0% and [Cu]: 2.0% to 8.0% are contained as a chemical composition at grain boundaries in a weld.

17. A device for hydrogen comprising:
the high-Mn austenitic stainless steel according to claim 13,
wherein the device for hydrogen is used in a high-pressure hydrogen gas and liquid hydrogen environment.

18. A device for hydrogen comprising:
the high-Mn austenitic stainless steel according to claim 14,
wherein the device for hydrogen is used in a high-pressure hydrogen gas and liquid hydrogen environment.

19. A device for hydrogen comprising:
the high-Mn austenitic stainless steel according to claim 15,
wherein the device for hydrogen is used in a high-pressure hydrogen gas and liquid hydrogen environment.

20. A welded joint comprising:
the high-Mn austenitic stainless steel according to claim 12,
wherein by mass %, [Mn]: 8.0% to 25.0% and [Cu]: 2.0% to 8.0% are contained as a chemical composition at grain boundaries in a weld.

* * * * *

UNITED STATES PATENT AND TRADEMARK OFFICE
CERTIFICATE OF CORRECTION

PATENT NO. : 11,225,705 B2
APPLICATION NO. : 16/493265
DATED : January 18, 2022
INVENTOR(S) : Kazuhisa Matsumoto et al.

It is certified that error appears in the above-identified patent and that said Letters Patent is hereby corrected as shown below:

On the Title Page

After the Prior Publication Data (65) section, please insert:
-- (30)  Foreign Application Priority Data
Mar. 30, 2017 (JP) ................................ 2017-069239 --

Signed and Sealed this
Thirty-first Day of May, 2022

Katherine Kelly Vidal
*Director of the United States Patent and Trademark Office*